US012456352B2

(12) United States Patent
Hufnagl-Abraham

(10) Patent No.: US 12,456,352 B2
(45) **Date of Patent: *Oct. 28, 2025**

(54) GAMING SYSTEMS, DEVICES, AND METHODS FOR CUSTOMIZED COMPETITIVE GAMING

(71) Applicant: IGT, Las Vegas, NV (US)

(72) Inventor: Klaus Hufnagl-Abraham, Graz (AT)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,794

(22) Filed: May 7, 2024

(65) Prior Publication Data

US 2024/0290176 A1 Aug. 29, 2024

Related U.S. Application Data

(63) Continuation of application No. 18/127,898, filed on Mar. 29, 2023, now Pat. No. 12,014,605, which is a continuation of application No. 17/395,803, filed on Aug. 6, 2021, now Pat. No. 11,625,986, which is a continuation of application No. 16/260,235, filed on Jan. 29, 2019, now Pat. No. 11,127,255.

(51) Int. Cl.
*G07F 17/32* (2006.01)

(52) U.S. Cl.
CPC ...... *G07F 17/3276* (2013.01); *G07F 17/3223* (2013.01); *G07F 17/3258* (2013.01); *G07F 17/3262* (2013.01)

(58) Field of Classification Search
CPC ............. G07F 17/3276; G07F 17/3223; G07F 17/3258; G07F 17/3262
See application file for complete search history.

(56) References Cited

U.S. PATENT DOCUMENTS

| | | | |
|---|---|---|---|
| 6,174,235 | B1 | 1/2001 | Walker et al. |
| 6,960,133 | B1 | 11/2005 | Marks et al. |
| 7,354,344 | B2 | 4/2008 | Paulsen et al. |
| 11,127,255 | B2 | 9/2021 | Hufnagl-Abraham |
| 11,625,986 | B2 | 4/2023 | Hufnagl-Abraham |
| 12,014,605 | B2 | 6/2024 | Hufnagl-Abraham |
| 2007/0225061 | A1 | 9/2007 | Naobayashi |

OTHER PUBLICATIONS

Official Action for U.S. Appl. No. 16/260,235, dated Jun. 30, 2020 6 pages.

(Continued)

*Primary Examiner* — Kevin Y Kim
(74) *Attorney, Agent, or Firm* — Sheridan Ross P.C.

(57) ABSTRACT

A method includes receiving first customized rules for a first game of a game type to be played by a first player on a first gaming device, and receiving second customized rules for a second game of the game type to be played by a second player on a second gaming device. The method includes establishing, for the first and second games, a competitive gaming session between the first gaming device and the second gaming device. The method includes determining possible payouts for the gaming session based on the first and second customized rules. The method includes applying the first customized rules to play the first game on the first gaming device to generate first customized game play information, and applying the second customized rules to play the second game on the second gaming device to generate second customized game play information.

9 Claims, 6 Drawing Sheets

(56) References Cited

OTHER PUBLICATIONS

Official Action for U.S. Appl. No. 16/260,235, dated Oct. 13, 2020 8 pages.
Official Action for U.S. Appl. No. 16/260,235, dated Jan. 21, 2021 8 pages.
Notice of Allowance for U.S. Appl. No. 16/260,235, dated May 10, 2021 8 pages.
Official Action for U.S. Appl. No. 17/395,803, dated Aug. 23, 2022 6 pages.
Notice of Allowance for U.S. Appl. No. 17/395,803, dated Dec. 9, 2022 7 pages.
Official Action for U.S. Appl. No. 18/127,898, dated Oct. 10, 2023 6 pages.
Notice of Allowance for U.S. Appl. No. 18/127,898, dated Feb. 8, 2024 7 pages.

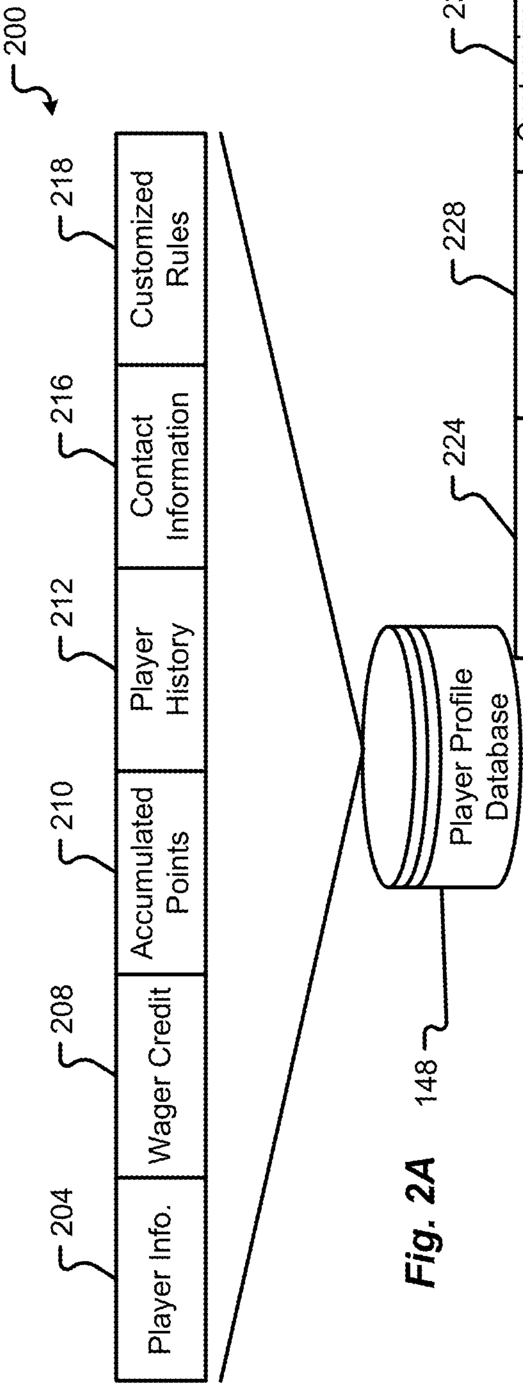
Fig. 2A
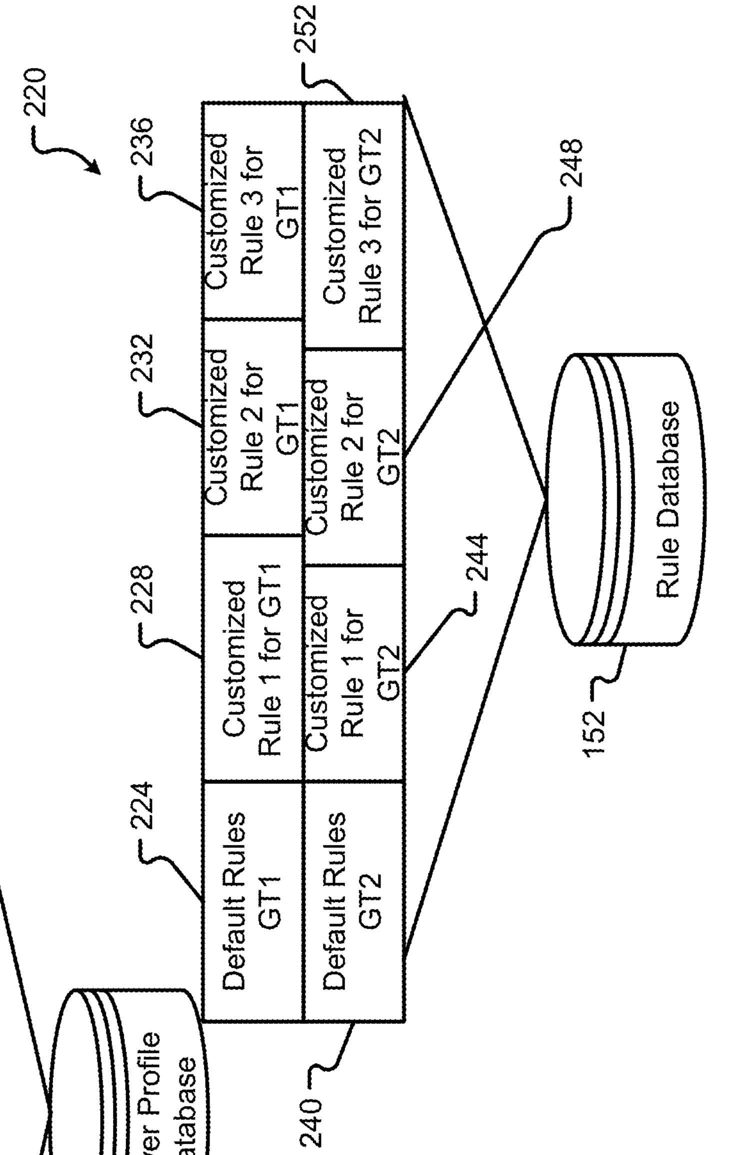
Fig. 2B
256
| Default Rule | Probability |
|---|---|
| DR1 | P1 |
| DR2 | P2 |
| DR3 | P3 |
| DR4 | P4 |
| DR5 | P5 |
| DR6 | P6 |
| Customized Rule | Probability |
|---|---|
| CR1 | P7 |
| CR2 | P8 |
| CR3 | P9 |
| CR4 | P10 |
| CR5 | P11 |
| CR6 | P12 |
Fig. 2C

GAMING SYSTEMS, DEVICES, AND METHODS FOR CUSTOMIZED COMPETITIVE GAMING

CROSS REFERENCE TO RELATED APPLICATIONS

The present application is a continuation of and claims the benefit of and priority to U.S. patent application Ser. No. 18/127,898, filed Mar. 29, 2023, which is a continuation of and claims the benefit of and priority to U.S. patent application Ser. No. 17/395,803, filed Aug. 6, 2021, now U.S. Pat. No. 11,625,986, issued Apr. 11, 2023, which is a continuation of and claims the benefit of and priority to U.S. patent application Ser. No. 16/260,235, filed Jan. 29, 2019, now U.S. Pat. No. 11,127,255, issued Sep. 21, 2021, the entire disclosures of each of which are incorporated herein by reference.

BACKGROUND

The present disclosure is generally directed toward gaming systems, devices, and methods.

Gaming devices within casinos are bound to a particular set of rules for playing the game. For example, in the case of a slot machine, the winning combinations of symbols and the probabilities of achieving the winning combinations symbols are preset and static.

BRIEF SUMMARY

At least one embodiment of the present disclosure includes a method that comprises receiving, by a processor, first customized rules for a first game of a game type to be played by a first player on a first gaming device. The first customized rules may be different from default rules of the game type. The method includes receiving, by the processor, second customized rules for a second game of the game type to be played by a second player on a second gaming device, where the second customized rules may be different than the default rules of the game type. The method includes establishing, by the processor for the first and second games, a competitive gaming session between the first gaming device and the second gaming device. The method includes determining, by the processor, possible payouts for the gaming session based on the first and second customized rules. The method includes applying, by the processor, the first customized rules to play the first game on the first gaming device to generate first customized game play information, and applying, by the processor, the second customized rules to play the second game on the second gaming device to generate second customized game play information.

At least one embodiment of the present disclosure includes a system that comprises a communications interface that communicates with a first gaming device and a second gaming device, a processor coupled with the communications interface, and a memory coupled with and readable by the processor. The memory stores instructions, which when executed by the processor, cause the processor to receive, via the communications interface from a first gaming device, first customized rules of a first game of a game type based on first input from a first player on the first gaming device, and receive, via the communications interface from a second gaming device, second customized rules of a second game of the game type based on second input from a second player on the second gaming device. The instructions cause the processor to establish, via the communications interface, a competitive gaming session between the first gaming device and the second gaming device, and apply the first customized rules and the second customizes rules to play the first game and the second game for a duration of the competitive gaming session.

At least one embodiment of the present disclosure includes a gaming device that comprises an input interface, a communications interface, a processor coupled with the communications interface and the input interface, and a memory coupled with and readable by the processor. The memory stores instructions, which when executed by the processor, cause the processor to receive, via the input interface, input from a player playing the gaming device that alters default rules of a game to first customized rules of the game desired by the player, and send, via the communications interface, a request to enter a competitive gaming session for the game using the first customized rules. The instructions cause the processor to receive, via the communications interface, an indication that another gaming device desires to enter the competitive gaming session for the game according to the first customized rules and second customized rules, where the second customized rules are selected by a player playing the another gaming device. The instructions cause the processor to determine a prize to be awarded at an end of the competitive gaming session based on the first customized rules and the second customized rules, and establish, via the communications interface, the competitive gaming session with the another gaming device. The instructions cause the processor to apply the first customized rules and the second customized rules to game play of the game for a duration of the competitive gaming session, and assign a value of the prize to a record based on points earned by each player during the game play.

Additional features and advantages are described herein and will be apparent from the following Description and the figures.

BRIEF DESCRIPTION OF THE SEVERAL VIEWS OF THE DRAWINGS

FIG. 2A is a block diagram depicting a first illustrative data structure used in accordance with at least one embodiment of the present disclosure;

FIG. 2B is a block diagram depicting a second illustrative data structure used in accordance with at least one embodiment of the present disclosure;

FIG. 2C illustrates a look-up table (LUT) in accordance with at least one embodiment of the present disclosure;

DETAILED DESCRIPTION

Figure 1:
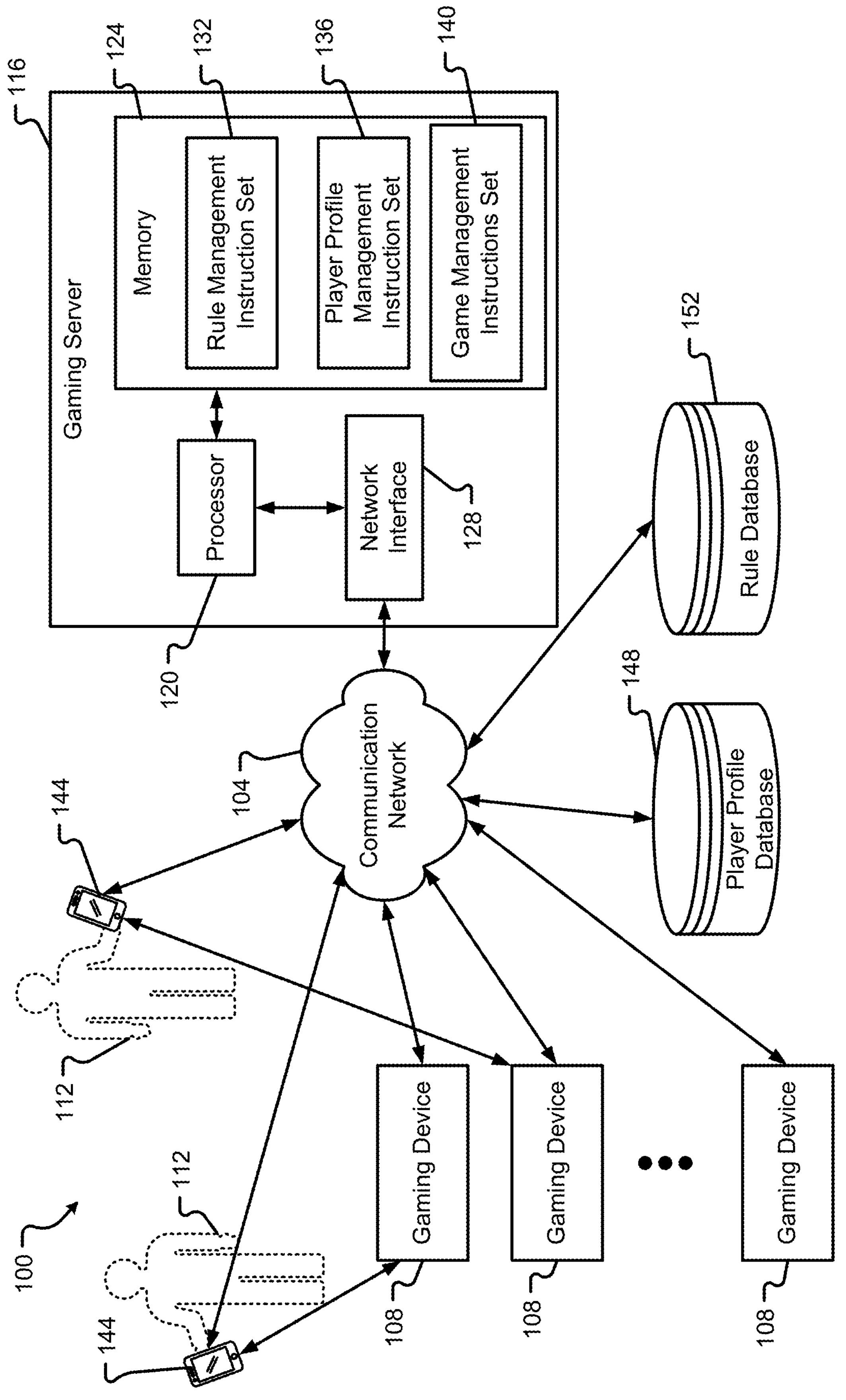
FIG. 1 is a block diagram of a gaming system in accordance with at least one embodiment of the present disclosure.

Embodiments of the present disclosure will be described in connection with a gaming system having one or multiple user devices that enable gaming activity. While certain embodiments of the present disclosure will reference the use of gaming device as a device that enables players to participate in gaming activity, it should be appreciated that embodiments of the present disclosure are not so limited. For instance, any computing device, personal gaming device, or collection of computing devices may be used to facilitate player engagement with a gaming system.

Players in a gaming environment may be more likely to play a particular game if the players have control or perceive control over the rules that govern the game. For example, for a slot machine, players may have a preference for a certain symbol, set of symbols, placement of symbols, etc. that do not normally provide a payout under default rules of the game. In another example, players may desire to choose their own conditions for insurance bets in video poker, video blackjack, etc. Accordingly, embodiments of the present disclosure allow players to select alternative or customized set of rules for the game or an extended gaming session, including customized user payout combinations, that provide payouts different from those provided under the default payout rules, thereby providing an improved gaming experience for the player.

For example, at a slot machine or video poker machine, the player could set their own winning combinations, how long the winning combinations are valid, insurance-based bets (e.g., no winning combinations in five spins), or other features of the game that are not different from default parameters and/or default payout rules. The number of game rules that are made available as an alternative to the default parameters or default payout rules may be preprogrammed by the machine so that payout tables are precalculated. The selection of alternative rules could come at a credit cost, opportunity cost (e.g., lost spin), or monetary cost to the player.

In some embodiments, the player could create/enable their own personal pay-combination. For example, a certain combination of symbols may be defined to pay more than under default payout rules if the player increases their bet or average bet.

With user tracking technology or mobile device connectivity, the player may also be enabled to apply their preferred rules to other games in the casino or define their customized set of rules on a mobile device, which then communicates the customized set of rules to the gaming device (e.g., a slot machine).

The details of when a player is allowed to alter the rules of the game may include: enabling alteration before each wagered game, enabling alteration randomly throughout a gaming session, enabling alteration at desired intervals throughout the gaming session, enabling alteration before a bonus round, enabling alteration depending on a predetermined situation (e.g., binding), etc. In at least one example, a secondary electronic record type (e.g., points or credits) is introduced to help track player performance over the course of a gaming session.

In addition, multiple players may compete against one another using their own/different sets of customized rules for a common game. In this case, the gaming devices may be linked to compete for a local area linked progressive prize or wide area linked progressive prize. For example, a player may select their own symbol(s) for winning combinations.

For example, a bank of four slot machines is played by two players: A & B. Player A chooses a winning combination to consist of Ace, King, King and gets assigned a score for this combo of ten points by the game. Player B chooses Queen, Queen, Queen and Queen to be the winning combination. The game or gaming system knows the probability for player B's combination is less likely and assigns 100 points to this combination. All four machines may share a must hit progressive that pays out to the player who contributes the last point to a desired threshold number of total points. Here, the threshold can be disclosed to the players or withheld from the players. Player A may more frequently contribute to incrementing the pot of total points, while player B can contribute larger chunks of points but less frequently. Upon reaching the threshold number of total points, the progressive prize is awarded to the appropriate player.

Allowing players to select alternative or customized set of rules for the game or an extended gaming session, including customized user payout combinations, that provide payouts different from those provided under the default payout rules can provide an improved gaming experience for the player while not compromising processing speed or player satisfaction.

With reference initially to FIG. 1, details of an illustrative gaming system 100 will be described in accordance with at least one embodiment of the present disclosure. The components of the gaming system 100, while depicted as having particular instruction sets and devices, are not necessarily limited to the examples depicted herein. Rather, a gaming system 100 according to embodiments of the present disclosure may include one, some, or all of the components depicted in the gaming system 100 and does not necessarily have to include all of the components in a single device. For instance, the components of a server may be distributed amongst a plurality of servers and/or other devices (e.g., a gaming device, portable user device, etc.) in the gaming system 100 without departing from the scope of the present disclosure.

The gaming system 100 is shown to include a communication network 104 that interconnects and facilitates machine-to-machine communications between one or multiple gaming devices 108 and a gaming server 116. It should be appreciated that the communication network 104 may correspond to one or many communication networks without departing from the scope of the present disclosure. In some embodiments, the various gaming devices 108 and server(s) 116 may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming devices 108 may be distributed throughout a single property or premises (e.g., a single casino floor) or the gaming devices 108 may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 may utilize the same or different types of communication protocols to connect with the communication network 104. It should also be appreciated that the gaming devices 108 may or may not present the same type of game to players 112. For instance, a first gaming device 108 and a second gaming device 108 may correspond to gaming devices that present a slot game. In another example, the first gaming device 108 may correspond to a slot game and the second gaming device 108 may correspond to a video poker game, and other gaming devices may present other types of games or a plurality of different games for selection and eventual play by the players 112. It may be possible for the some of the gaming devices 108 to communicate with one another via the communication network 104. In some embodiments, one or more of the gaming devices 108 may only be configured to communicate with a centralized management server and/or the gaming server 116. Although not depicted, the system 100 may include a separate server or collection of servers that are responsible for managing the operation of the various gaming devices 108 in the gaming system 100. It should also be appreciated that the gaming server 116 may or may not be co-located with one or more gaming devices 108 in the same property or premises. Thus, one or more gaming devices 108 may communicate with the gaming server 116 over a WAN, such as the Internet. In such an event, a tunneling protocol or Virtual Private Network (VPN) may be established over some of the communication network 104 to ensure that communications between a gaming device 108 and a remotely-located server 116 are secured. Additionally or alternatively, one or multiple gaming devices 108 may function as the gaming server 116.

One, some, or all of the gaming devices 108 may correspond to a type of device that enables a first player 112 to interact with a second player 112 in connection with playing games of chance and/or skill. A gaming device 108 may include any type of known gaming device such as a slot machine, a table game, an electronic table game (e.g., video poker), a skill-based game, etc. The gaming device 108 can be in the form of an electronic gaming machine, virtual gaming machine, video game gambling machine, etc. In addition to playing games on a gaming device 108, the players 112 may also be allowed to interact with and play games of chance and/or skill on respective mobile devices 144. A mobile device 144 may correspond to a player's 112 personal device (e.g., a smartphone) or to a device issued to the player 112 during the player's visit at a particular casino. It should be appreciated that the player 112 may play games directly on their mobile device 144 and/or the mobile device 144 may be in communication with a gaming device 108 such that the mobile device 144 provides the human-to-machine interface for the player 112 to the gaming device 108. As shown in FIG. 1, the mobile device 144 may be in communication with the communication network 104 or in direct communication (e.g., via Bluetooth, WiFi, etc.) with a gaming device 108. Non-limiting examples of a mobile device 144 include a cellular phone, a smart phone, a tablet, a wearable device, an augmented reality headset, a virtual reality headset, a laptop, a Personal Computer (PC), or the like.

The gaming server 116 is further shown to include a processor 120, memory 124, and a network interface 128. These resources may enable functionality of the gaming server 116 as will be described herein. For instance, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data into a player profile database 148 and/or rules database 152 and retrieve information from the databases. Alternatively or additionally, the player profile database 148 or data stored therein may be stored internal to the server 116 (e.g., within the memory 124 of the server 116 rather than in a separate database). Alternatively or additionally, the rules database 152 or data stored therein may be stored internal to the server 116.

Illustrative instruction sets that may be stored in memory 124 include, without limitation, a rule management instruction set 132, a player profile management instruction set 136, and a game management instruction set 140. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

In some embodiments, the rule management instruction set 132, when executed by the processor 120, may enable the gaming server 116 to manage various rules associated with the gaming devices 108. For example, the rule management instruction set 132 may enable the gaming server 116 to retrieve default rules of games played on the gaming devices 108 from the rules database 152, receive customized rules for playing games on the gaming devices 108, update the rules database 152 with customized rules and/or additional default rules, and/or generate a selection of customized rules for games played on the gaming devices 108, etc.

In some embodiments, the rules management instruction set 132 enables the processor 120 to perform any action consistent with the generation and/or receipt of default and customized rules for playing games on the gaming devices 108.

The player profile management instruction set 136, when executed by the processor 120, may enable the gaming server 116 to manage one or more player profiles within the player profile database 148. In some embodiments, the player profile management instruction set 136 may be configured to manage a player loyalty profile including settings for such player profiles, available wager credits for such profiles, determine player wager history, and/or determine which, if any, customized rules are associated with a particular player 112 for a particular game. It should also be appreciated that the player profile management instruction set 136 may be configured to manage player profiles of players that do not have loyalty accounts or any other predetermined player account.

The game management instruction set 140, when executed by the processor 120, may enable the gaming server 116 to manage the various games played by a player 112 at the gaming devices 108 and/or a mobile device 144 carried by the player 112. In other words, any game played by the player 112 at one or more of the devices 108, 144 may be managed, partially or entirely, by execution of the game management instruction set 140. The game management instruction set 140 may also enable the processor 120 to establish a competitive gaming session between gaming devices 108 based on customized rules selected by a player 112 of each gaming device 108, apply the customized rules to the games being played at each gaming device 108 to generate respective customized game play information, and determine payouts for the games based on the customized game play information.

With reference now to FIGS. 2A and 2B, additional details of data structures that are useable in connection with managing customized rules will be described in accordance with at least one embodiment of the present disclosure. It should be appreciated that the data structures depicted and described herein may be stored within a central database or may be distributed among a number of data storage nodes. Alternatively or additionally, some or all of the fields of the data structures may be maintained in devices of the gaming system 100 such as the gaming server 116, a gaming device 108, and/or a mobile device 144 without departing from the scope of the present disclosure.

With reference initially to FIG. 2A, details of a data structure 200 that may be maintained as part of a player profile will be described in accordance with at least one embodiment of the present disclosure. The player profile database 148 may be configured to store one or multiple data structures 200 that are used in connection with tracking player progress, gaming history, rule selection, etc. In some embodiments, the data stored in the data structure 200 may be stored for a plurality of different player profiles or for a single player profile. As a non-limiting example, the data structure 200 may be used to store player loyalty information, player history information, and the like. Even more specifically, the data structure 200 may include a plurality of data fields that include, for instance, a player information field 204, a wager credit field 208, an accumulated points field 210, a player history field 212, a contact information field 216, and a customized rules field 218. Here, it should be appreciated that the data structure 200 may have greater or fewer fields than depicted in FIG. 2A.

The player information field 204 may be used to store any type of information that identifies a player or a group of players. In some embodiments, the player information field 204 may store one or more of username information for a player 112, password information for a player account, player status information, accommodations associated with the player 112, and any other type of customer service management data that may be stored with respect to a player 112.

The wager credit field 208 may be used to store data about a player's 112 available credit and with a device, with a sports book, with a casino, and/or with a plurality of casinos. For instance, the wager credit field 208 may store an electronic record of available credit in the player's account and whether any restrictions are associated with such credit. The wager credit field 208 may further store information describing a player's available credit over time, cash out events for the player, winning events for the player, wagers placed by the player, tickets/vouchers issued to the player, and the like.

The accumulated points field 210 may be used to store data about a player's 112 accumulated points. For example, the accumulated points field 210 stores a number of points accumulated by a player 112 while playing a game during a competitive gaming session against another player 112 playing the same game. The accumulated points field 210 is different from the wager credit field 208 in that the accumulated points field 210 is not indicative of a player's 112 available credit. Instead, the accumulated points field 210 is a second record used to track points earned by a player 112 during a competitive gaming session earned as a result of the occurrence of gaming event. The accumulated points field 210 may then be accessed (e.g., at an end of the competitive gaming session) to determine whether the player 112 earned a prize that may increment available credit stored in the wager credit field 208.

The player history field 212 may be used to store historical data for events that occur with respect to the player 112. For instance, the player history field 212 may store information related to a player's 112 outcome in a game of chance, a player's 112 outcome in a game of skill, a celebration event for a person other than the player 112, a player's 112 involvement in a celebration event, a player 112 visiting a predetermined location, a player 112 playing a particular game, a player interacting with their mobile device 144, wagers placed by the player 112, tickets/vouchers issued for the player 112, tickets/vouchers redeemed by the player 112, etc.

The contact information field 216 may store information associated with a player's 112 preferred modes of contact and how such contact can be made. For instance, the contact information field 216 may store information such as an email address, phone number, room number, player loyalty number, address, etc.

The custom rules field 218 may store information associated with the player's 112 selection of customized rules for games played on the gaming devices 108. The customized rules for a game may differ from default rules of the game. The default rules may be the initial rules that govern a game on a gaming device 108 prior to any requested modification to customized rules by the player 112 or other entity. Such a selection of customized rules may include, for example, a selection of a gaming event or a set of gaming events desired by the player 112 for a particular game. Each set of customized rules may be associated with a player 112 and/or a particular game type being played on the gaming devices 108. In the case where the game type is a slot game, the gaming event or set of gaming events may correspond to player desired winning combinations symbols for that slot machine, which may be different from default winning combinations of symbols. For example, if default rules of the slot game provide for the winning combination of symbols "7, 7, 7," the player 112 may select their own rules such that the winning combination symbols is "7, BAR, 7" where this combination was not considered a winning combination under the default rules. In another example, if the game is a video poker game with default rules for five-card draw, then the custom rules field 218 may contain a player's 112 selection of rules that differ from the default rules. For example, the player 112 may select a rule that provides a payout for obtaining three cards of the same suit. Alternatively or additionally, customized rules may relate to a card or a symbol appearing in a particular position with respect other the cards or symbols (e.g., a "7" appears in the leftmost position of the reel of a slot machine or on the display of a video poker machine, a particular column or row if there are multiple lines, etc.). Further, the customized rules may comprise insurance-based rules (e.g., a selection that provides a payout if there are no winning combinations within five spins). Here, it should be understood that the player 112 may select any combination of gaming events as their customized rules, but the number may be limited by the gaming system 100.

The custom rules field 218 may store the player selected custom rules (e.g., the player selected winning combination of symbols) for games offered by the gaming devices 108 as the player 112 plays the games to keep an ongoing record of the player's 112 desired rules for the games. The custom rules field 218 may be accessed when it is desired to determine whether the custom rules field 218 already contains custom rules for the game that the player 112 wants to play. If so, upon recognition that a player 112 is about to play or is playing a particular game, the gaming device 108 and/or the mobile device 144 offering that game may present the stored custom rules to the player 112 as an option to alter default rules of the game to the stored customized rules in custom rules field 218. As will be appreciated, the custom rules field 218 can comprise multiple different custom rule sets for different types of games, such as a first custom rule set for poker and a second custom rule set for slots.

With reference now to FIG. 2B, details of another data structure 220 that may be used within the gaming system 100 will be described in accordance with at least one embodiment of the present disclosure. The rule database 152 may be configured to store one or multiple data structures 220 that are used in connection with storing customized rules. For example, customized rules may be stored in the rule database 152 so as to be disassociated with a particular player 112. That is, customized rules may be stored separately from or in combination with a player's 112 profile, and instead are associated with the gaming devices 108 and the games offered by the gaming devices 108. Thus, if a player 112 does not have a stored set of customized rules associated with their player profile, a different set of customized rules can be accessed at the rule database 152 and presented to the player 112 as an initial option to depart from the default rules of the game. The customized rules that are disassociated with players 112 may be generated according to preferences of other players, preferences of the manufacturer, preferences of the operating entity, etc. Here, it should be appreciated that the data structure 220 may have greater or fewer fields than depicted in FIG. 2B.

The default rules fields 224 and 240 may store default rules for a particular game type (GT). For example, default rules field 224 stores default rules for a first game type GT1 (e.g., a slot game) while default rules field 240 stores default rules for a second game type GT2 (e.g., a video poker game or a different style of slot game than the style of game of GT1). The default rules may be updateable as desired (e.g., by the casino) within the gaming system 100. The custom rules fields 228, 232, 236, 244, 248, and 252 may store custom rules associated with each game type GT. For example, fields 228, 232, and 236 store respective customized rules 1, 2, and 3 for the first game type GT1 while fields 244, 248, and 252 store respective customized rules 1, 2, and 3 for the second game type GT2.

FIG. 2C illustrates a look-up table (LUT) 256 according to at least one embodiment. The LUT 256 may be part of the rule database 152 or part of a separate database in the gaming system 100. Here, the LUT 256 may correspond to a payout table for one game type played on the gaming devices 108. However, it should be understood that a payout table having a same or similar structure as that shown in LUT 256 will exist for each game type playable on the gaming devices 108, where each game type has its own set of default rules, customized rules, and associated probabilities. It should be further understood that the LUT 256 may include fewer or more rows of rules and associated probabilities according to design choices. The LUT 256 may include additional columns, for example, if the LUT 256 is desired to contain different sets (e.g., player selectable sets) of default and/or customized rules for a same game type. Additionally, rows may be subtracted or added as desired.

As shown in FIG. 2C, the LUT 256 includes a first column that contains default rules DR1 to DR6 and a second column that includes probabilities P1 to P6. That is, each default rule DR1 to DR6 has an associated probability P1 to P6 of occurring on a gaming device 108. Similarly, the LUT 256 includes a column containing customized rules CR1 to CR6 and another column containing probabilities P7 to P12 for each customized rule CR1 to CR6. In at least one embodiment, the probabilities P1 to P12 are predetermined by the gaming system 100 and stored in the LUT 256. Additionally or alternatively, one or more of the probabilities P7 to P12 may be determined by the gaming system 100 on in real time, for example, when the player 112 selects or creates a customized rule that was not already present in the LUT 256. Upon selection or creation of a customized rule, the gaming system 100 may access the LUT 256 and present an associated probability to the player 112.

As will be appreciated, the LUT for the default rules before customization may be different from the LUT for the customized rules. While the LUTs may share common default rules and associated probabilities, the customized rule LUT may have some default rules and associated probabilities in the default rule LUT replaced by customized rules with associated customized rule probabilities.

Figure 3:
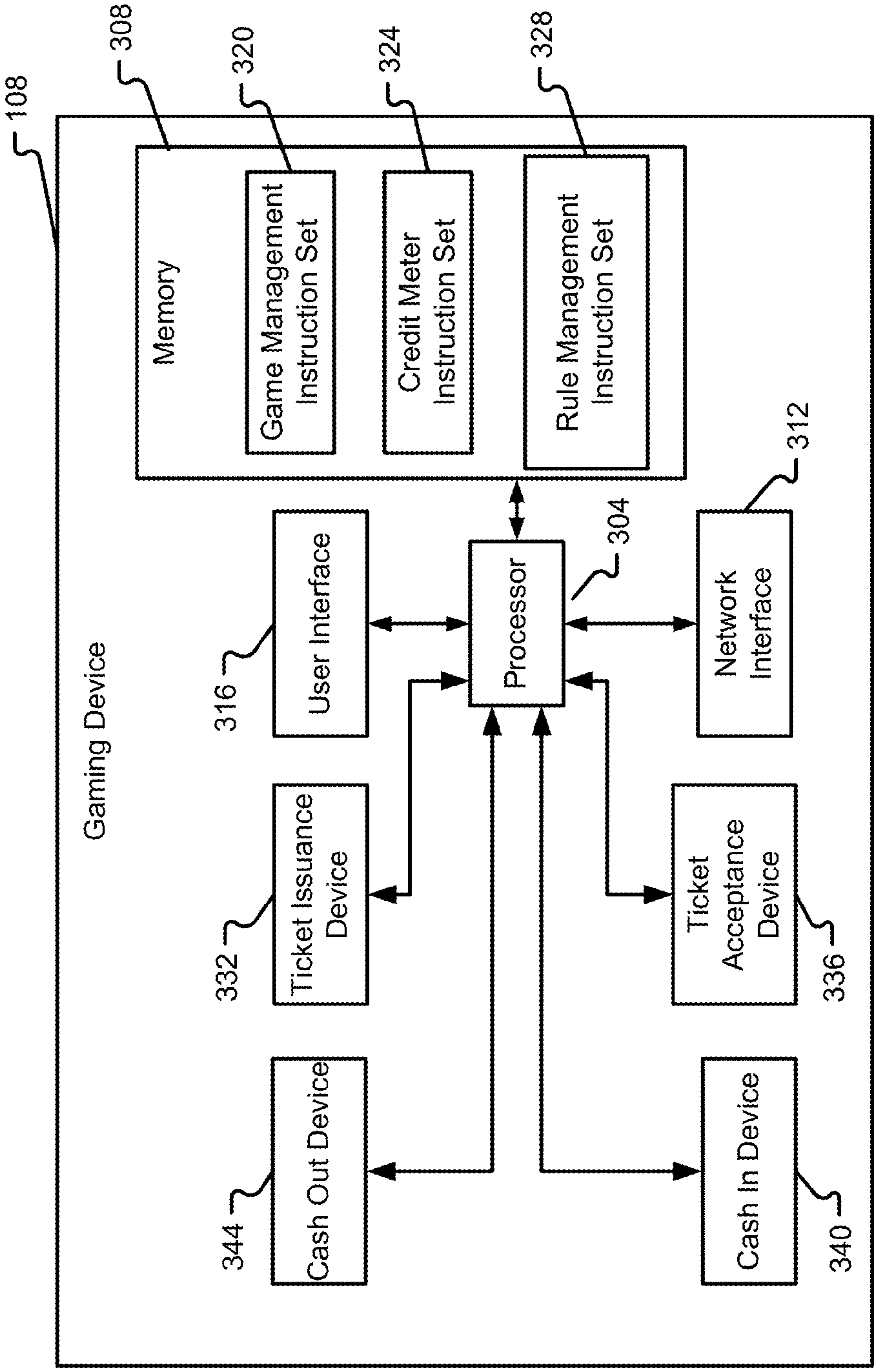
FIG. 3 is a block diagram depicting an illustrative gaming device in accordance with at least one embodiment of the present disclosure.

With reference now to FIG. 3, additional details of a gaming device 108 will be described in accordance with at least one embodiment of the present disclosure. While depicted as a gaming device 108, it should be appreciated that some or all of the components of the gaming device 108 may be included in a player's 112 mobile device 144 and/or the gaming server 116 (e.g., when the gaming server 116 also has gaming capabilities) without departing from the scope of the present disclosure.

The gaming device 108 is depicted to include a processor 304, memory 308, a network interface 312, a user interface 316, a ticket issuance device 332, a ticket acceptance device 336, a cash in device 340, and a cash out device 344. In some embodiments, the processor 304 may be similar or identical to the processor 120. In other words, the processor 304 may correspond to one or many microprocessors, CPUs, micro-controllers, or the like. The processor 304 may be configured to execute one or more instruction sets stored in memory 308.

The network interface 312 may also be similar or identical to network interface 128. The nature of the network interface 312, however, may depend upon whether the network interface 312 is provided in a gaming device 108 or a mobile user device 144. Examples of a suitable network interface 312 include, without limitation, an Ethernet port, a USB port, an RS-232 port, an RS-485 port, a NIC, an antenna, a driver circuit, a modulator/demodulator, etc. The network interface 312 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 316 may correspond to any type of input and/or output device that enables the player 112 to interact with the gaming device 108. As can be appreciated, the nature of the user interface 316 may depend upon the nature of the gaming device 108. For instance, if the gaming device 108 is a traditional mechanical reel slot machine, then the user interface 316 may include one or more mechanical reels with symbols provided thereon, one or more lights or LED displays, one or more depressible buttons, a lever or "one armed bandit handle", a speaker, or combinations thereof. If the gaming device 108 is a digital device, then the user interface 316 may include one or more touch-sensitive displays, LED/LCD display screens, etc. The user interface 316 may be used by a player 112 to input customized rules for the game on the gaming device 108 for use during a competitive gaming session with one or more other gaming devices 108.

The memory 308 may be similar or identical to memory 124. For instance, the memory 308 may include one or multiple computer memory devices that are volatile or non-volatile. The memory 308 may be configured to store instruction sets that enable player interaction with the gaming device 108, that enable game play at the gaming device 108, and/or that enable coordination with the gaming server 116. Examples of instruction sets that may be stored in the memory 308 include a game instruction set 320, a credit meter instructions set 324, and a rule instruction set 328.

In some embodiments, the game instruction set 320, when executed by the processor 304, may enable the gaming device 108 to facilitate one or more games of chance and/or skill and produce interactions between the player 112, the game of chance and/or skill, and/or between another player 112 on another gaming device 108. In some embodiments, the game instruction set 320 may include subroutines that present one or more graphics to the player 112 via the user interface 316, subroutines that calculate whether a particular wager has resulted in a win or loss during the game of chance or skill, subroutines for determining payouts for the player 112 in the event of a win, subroutines for exchanging communications with a connected server (e.g., gaming server 116 or the like), subroutines for enabling the player 112 to engage in a game using their mobile user device 144, and any other subroutine or set of instructions that facilitate gameplay at or in association with the gaming device 108.

The credit meter instruction set 324 may correspond to a secure instruction set and/or data structure within the gaming device 108 that facilitates a tracking of activity at the gaming device 108. In some embodiments, the credit meter instruction set 324 may be used to store or log information related to various player 112 activities and events that occur at the gaming device 108. The types of information that may be maintained in the credit meter instruction set 324 include, without limitation, player information, available credit information, wager amount information, and other types of information that may be recorded for purposes of accounting for wagers placed at the gaming device 108 and payouts made for a player 112 during a game of chance and/or skill played at the gaming device 108. In some embodiments, the credit meter instruction set 324 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the credit meter instruction set 324 may be updated in response to outcomes of a game of chance or skill played at the gaming device 108. In some embodiments, the credit meter instruction set 324 may be updated depending upon whether the gaming device 108 is issuing a ticket/voucher, being used as a point of redemption for a ticket/voucher, and/or any other activity associated with a ticket/voucher. Some or all of the data within the credit meter instruction set 324 may be reported to the gaming server 116, for example, if such data applies to a centrally-managed game such as a competitive gaming session between two or more gaming devices 108. As an example, the number, value, and timing of wagers placed by a particular player 112 and payouts on such wagers may be reported to the gaming server 116.

Activities of the gaming device 108 related to rule selection activity may be managed and reported by the rule management instruction set 328. In some embodiments, when a default rule or default set or rules is altered to a customized rule or set of customized rules, information associated with the customized rules may be obtained by the rule management instruction set 328 and reported to the gaming server 116. Furthermore, the rule management instruction set 328 may be configured to update the default rules of a game if, for example, the managing entity of the game desires. In some embodiments, the rule management instruction set 328 contains the same or similar rule information as the rules database 152.

Because the gaming device 108 may be used for the acceptance and issuance of tickets/vouchers, the gaming device 108 may be provided with appropriate hardware to facilitate such acceptance and issuance. Specifically, the gaming device 108 may be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a physical ticket acceptor, a shredder, etc. The ticket acceptance device 336 may be configured to accept physical tickets and/or electronic tickets without departing from the scope of the present disclosure. An electronic ticket/voucher may be accepted by scanning a one-dimensional barcode, two dimensional barcode, or other type of barcode or quick response (QR) code displayed by a player's 112 mobile device 144, for example.

The ticket issuance device 332 may be configured to print or provide physical tickets/vouchers to players 112. In some embodiments, the ticket issuance device 332 may be configured to issue a ticket/voucher consistent with an amount of credit available to a player 112, as indicated within the credit meter instruction set 324, for example.

The cash in device 340 may include a bill acceptor, a coin acceptor, a chip acceptor or reader, or the like. In some embodiments, the cash in device may also include credit card reader hardware and/or software. The cash out device 344, like the ticket issuance device 322, may operate and issue cash, coins, tokens, or chips based on an amount indicated within the credit meter instruction set 324. In some embodiments, the cash out device 344 may include a coin tray or the like and counting hardware configured to count and distribute an appropriate amount of coins or tokens based on a player's 112 winnings or available credit within the credit meter instruction set 324.

Although not explicitly shown, a mobile device 144 may include at least some of the same or similar elements as a gaming device 108. For example, a mobile device 144 may include a user interface, a processor, a network interface, and memory the same as or similar to user interface 316, processor 304, network interface 312, and memory 308. The contents of the memory of the mobile device 144 may include the same or similar instructions sets as those described for the memory 124 and the memory 308. Further, the mobile device 144 may include other hardware and/or software components known to facilitate the functionality of a mobile device 144 communicating with the gaming server 116 and/or one or multiple gaming devices 108 as described herein as well as other functionality known to be associated with smart phones, personal computers, smart watches, etc.

Figure 4:
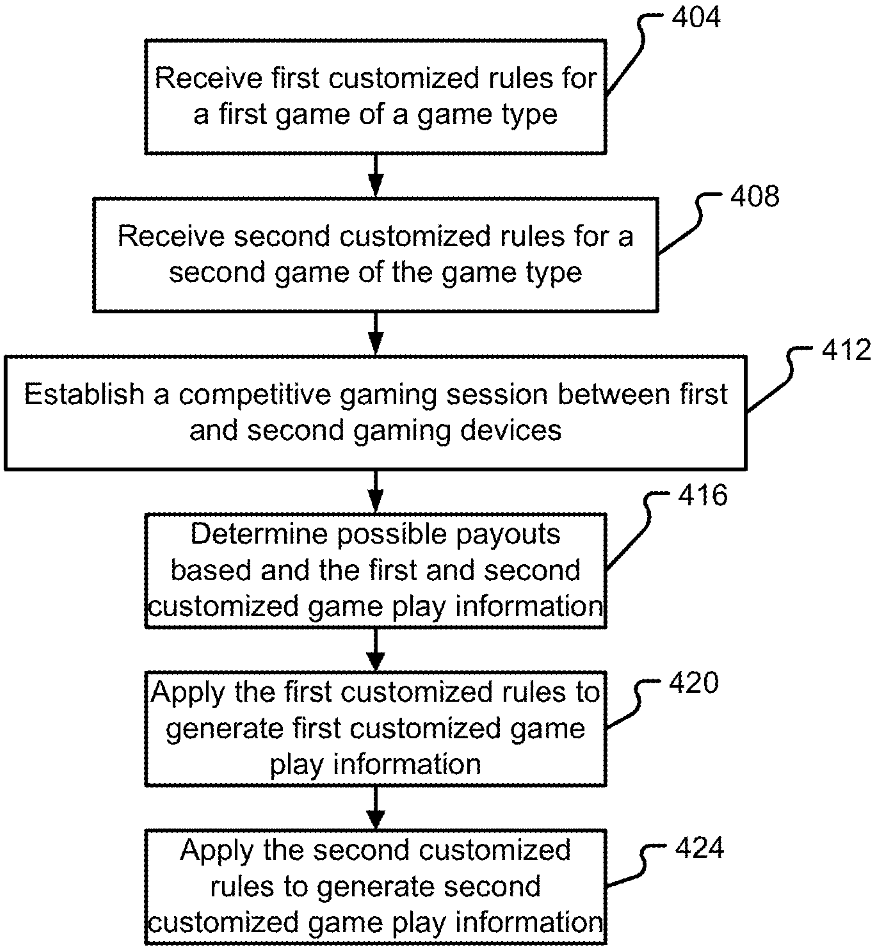
FIG. 4 illustrates a method in accordance with at least one embodiment of the present disclosure.

FIG. 4 illustrates a method according to at least one embodiment of the present disclosure. The operations discussed with respect to FIG. 4 may be performed by a gaming system 100. For example, the operations of FIG. 4 may be performed a processor 120 of the gaming server 116, a processor 304 of a gaming device 108, a processor of a mobile device(s) 144, or any combination of processors of the gaming server 116, mobile device(s) 144, and one or multiple gaming device(s) 108.

Operation 404 includes receiving, by a processor, first customized rules for a first game of a game type to be played by a first player 112 on a first gaming device 108. Here, the first customized rules are different from default rules of the game type.

Operation 408 includes receiving, by the processor, second customized rules for a second game of the game type to be played by a second player 112 on a second gaming device 108 different than the first gaming device Similar to the first customized rules, the second customized rules are different than the default rules of the game type. As noted above, the default rules may be the initial rules that govern the first and second games prior to any requested modification to first and second customized rules by the players 112.

The first and second customized rules may be input by each player 112 into a respective user interface 316 of the gaming devices 108. In at least one embodiment, a player 112 selects from a predefined set of customized rules offered by the gaming device 108 (e.g., stored in the rule instructions 328) and/or retrieved from the custom rules field 214 in the player profile database 148 or from the rule database 152. Additionally or alternatively, the players 112 may input their own selection of rules based on preference without selecting from a predefined set of customized rules.

The option to select customized rules for a game may be presented to a player 112 before the game begins and/or after the game begins but in response to one or more satisfied conditions (e.g., upon reaching a bonus round, upon placing a wager over a threshold amount in a single wager or over multiple wagers, after expiration of a timer, etc.).

In at least one example, the first and second games may be a same type of game, for example, a slot game being played on respective first and second gaming devices 108. However, example embodiments are not limited thereto and other game types are possible (e.g., video poker, other video table games, etc.). In at least one example, the first customized rules comprise a first selection of a first gaming event (or a first set gaming events including the first gaming event) desired by the first player, and the second customized rules comprise a second selection of a second gaming event (or a second set of gaming events including the second gaming event) desired by the second player. In at least one embodiment, the first set gaming events and the second set gaming events are selected from a same main set gaming events. In other words, the first set of gaming events selected by player 112 and the second set of gaming events selected by a different player 112 may be subsets of a main set of possible gaming events offered by the gaming devices 108.

As noted above, a gaming event may be a player desired outcome for the game being played on the gaming devices 108, where the player desired outcome is awarded with a prize under the customized rules but not under the default rules.

Operation 412 includes establishing, by the processor for the first and second games, a competitive gaming session between the first gaming device 108 and the second gaming device 108. The gaming session may be established between the gaming devices 108 by the gaming server 116 using the communication network 104 through any known session establishment and/or authentication method employed by the communication network 104.

Operation 416 includes determining, by the processor for the competitive gaming session, payouts for the first and second games based on the first and second customized rules. For example, upon selection of the customized rules by a player 112, the method may determine probabilities associated with the selection of the customized rules. For example, if the selection of the customized rules was made from a predetermined set of customized rules, then determining the probabilities may include accessing the look-up table (LUT) in FIG. 2C that has probabilities associated with each customized rule in the set of customized rules. Additionally or alternatively, if all or part of the selection of customized rules is not contained in the LUT, then the probabilities may be determined in real time. After determining the probabilities associated with each player's 112 selection of customized rules, the method can determine a set of possible payouts associated with the selection of customized rules. For example, the method may determine a possible payouts for possible wagers to be made during game play for the selection of customized rules.

In operation 420, the method includes applying, by the processor, the first customized rules to play the first game on the first gaming device 108 to generate first customized game play information. Operation 424 includes applying, by the processor, the second customized rules to play the second game on the second gaming device 108 to generate second customized game play information. For example, the gaming server 116 and/or each gaming device 108 refers to game management instruction sets 140 and/or 320 to apply the customized rules and manage game play of the first and second games. The first and second customized game play information may include data related to each gaming event that occurs on a respective gaming device 108. Such data may include an amount wagered on the gaming event, an outcome of the gaming event, a point value associated with the outcome of the gaming event, and/or the like. The customized game play information may be reported to an entity (e.g., the gaming server) that manages credit records for the players 112 to track a player's 112 earned and/or wagered credits.

Figure 5:
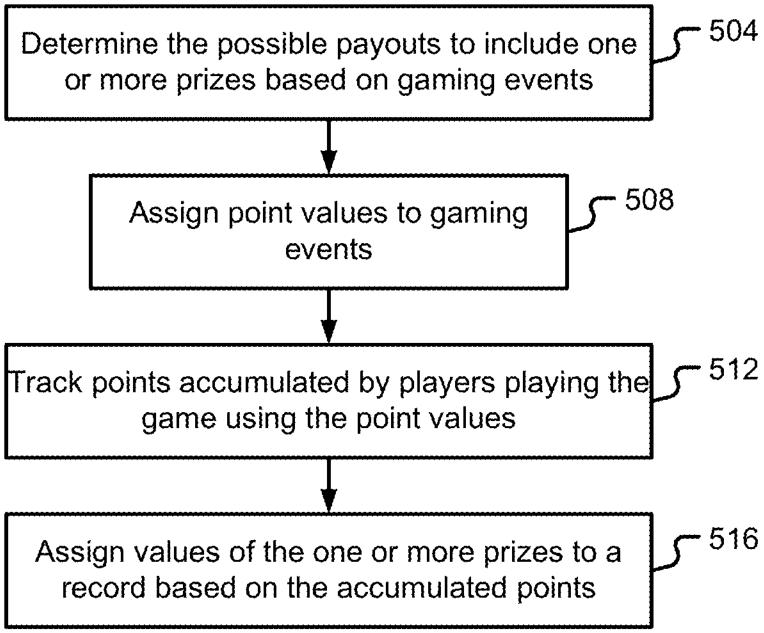
FIG. 5 illustrates a method in accordance with at least one embodiment of the present disclosure.

FIG. 5 illustrates a method according to at least one embodiment of the present disclosure. The operations discussed with respect to FIG. 5 may be performed by a gaming system 100. For example, the operations of FIG. 5 may be performed a processor 120 of the gaming server 116, a processor 304 of a gaming device 108, a processor of a mobile device(s) 144, or any combination of processors of the gaming server 116, mobile device(s) 144, and one or multiple gaming device(s) 108. It should be understood that FIG. 5 illustrates additional details of the operations in FIG. 4 or additional operations that may be part of the method in FIG. 4.

In operation 504, the method may include determining, by the processor, the possible payouts (e.g., the possible payouts determined in operation 416) to include one or more prizes for the competitive gaming session based on gaming events. For example, the method includes determining the possible payouts to include a first prize for the competitive gaming session based on the first gaming event and the second gaming event. The first prize may be determined to have an initial value which may be static for the duration of the competitive gaming session. However, in at least one example, the first prize is a progressive prize that increases in value over the duration of the competitive gaming session. The first prize may include credits that can be exchanged for currency or other valuable item/service. The value of the first prize may be presented to or hidden from the players 112 during the competitive gaming session. Operation 504 may determine the possible payouts to include a second prize associated with the first gaming event for the competitive gaming session. In addition, operation 504 may determine the possible payouts to include a third prize associated with the second gaming event for the competitive gaming session. Here, the second prize may be specific to the first gaming event and the third prize may be specific to the third gaming event. That is, the occurrence of the first gaming event may award the second prize while the occurrence of the second gaming event may award the third prize. The first, second, and third prizes may be different in value from one another.

Operation 508 includes assigning, by the processor, point values to gaming events. For example, operation 508 includes assigning, by the processor, a first point value to the first gaming event based on a preset occurrence of the first gaming event, and assigning, by the processor, a second point value to the second gaming event based on a preset occurrence of the second gaming event. The preset occurrence of a gaming event may be the probability of that gaming event occurring on a gaming device 108 during game play which is known to the processor, for example, as a result of programming. In at least one embodiment, point values assigned to gaming events are inversely proportional to the probabilities of the gaming events occurring. For example, higher point values are assigned to gaming events that have lower probabilities of occurring while lower point values are assigned to gaming events that have higher probabilities of occurring.

Operation 512 includes tracking, by the processor, points accumulated by players 112 playing the game using the point values determined in operation 508. For example, operation 512 includes tracking first points accumulated by the first player 112 playing the first game for a duration of the competitive gaming session using the first point value. Operation 512 may further include tracking second points accumulated by the second player 112 playing the second game for the duration of the competitive gaming session using the second point value. In at least one embodiment, the first points are included in the first customized game play information and stored in an associated accumulated points field 210, and the second points are included in the second customized game play information and stored in an accumulated points field 210. For example, each time a player 112 earns points upon occurrence of a winning gaming event on a gaming device 108, the points are reported to the gaming server 116 as part of the customized play information and stored as part of the player's 112 player profile in the accumulated points field 210 for a duration of the gaming session or other desired amount of time. The points earned by a player 112 are accumulated (e.g., added) over the duration of the gaming session.

Operation 516 includes assigning, by the processor, values of the one or more prizes to a record based on the accumulated points. The record may be the wager credit field 208 associated with a particular player profile from FIG. 2A. Operation 516 may include assigning a value of the first prize to a record based on the accumulated first points and the accumulated second points. For example, the value of the first prize is assigned to a first record associated with the first player 112 when the accumulated first points are greater than the accumulated second points, and the value of the first prize is assigned to a second record associated with the second player 112 when the accumulated second points are greater than the accumulated first points. Operation 516 may include assigning a value of the second prize to the first record during the competitive gaming session when the first gaming event occurs on the first gaming device 108. Operation 516 may include assigning a value of the third prize to the second record during the competitive gaming session when the second gaming event occurs on the second gaming device 108. Operation 516 is discussed in more detail below with reference to FIG. 6.

Figure 6:
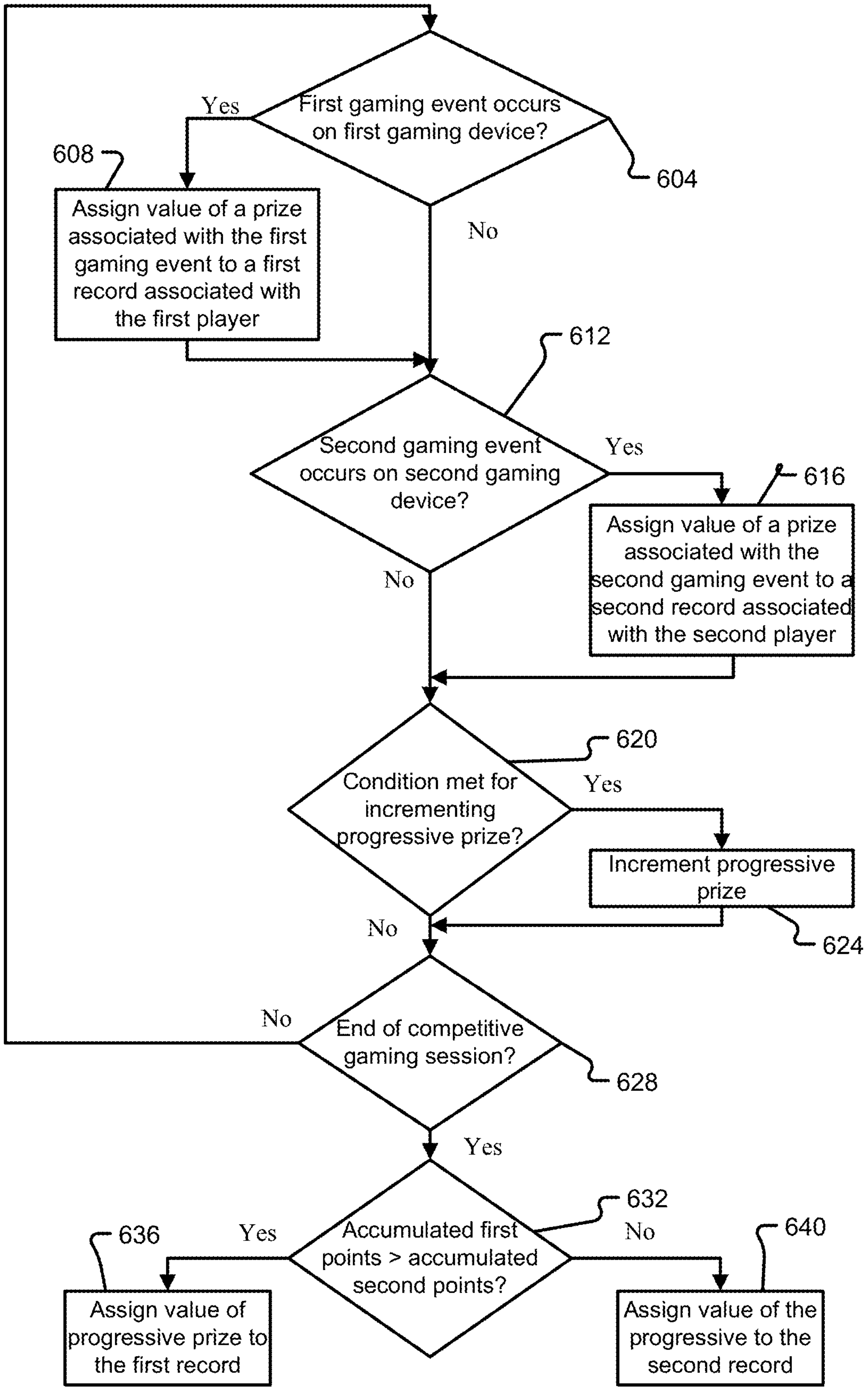
FIG. 6 illustrates a method in accordance with at least one embodiment of the present disclosure.

FIG. 6 illustrates a method according to at least one embodiment of the present disclosure. The operations discussed with respect to FIG. 6 may be performed by a gaming system 100. For example, the operations of FIG. 6 may be performed a processor 120 of the gaming server 116, a processor 304 a gaming device 108, a processor of a mobile device(s) 144, or any combination of processors of the gaming server 116, mobile device(s) 144, and one or multiple gaming device(s) 108. It should be understood that FIG. 6 illustrates additional details of the operations in FIGS. 4 and 5 or additional operations that may be part of the methods in FIGS. 4 and 5. For example, FIG. 6 relates to additional details associated with operation 516 in FIG. 5.

In operation 604, the method includes determining, by the processor, whether the first gaming event occurs on the first gaming device 108. If so, then the method proceeds to operation 608 and assigns a value of a prize associated with the first gaming event to a first record associated with the first player 112. If not, the method proceeds to operation 612, which includes determining, by the processor, whether the second gaming event occurs on the second gaming device 108.

If operation 612 determines that the second gaming event occurs on the second gaming device 108, the method proceeds to operation 616 which includes, assigning, by the processor, a value of a prize associated with the second gaming event to a second record associated with the second player 112. If not, the method proceeds to operation 620.

In operation 620, the method includes determining, by the processor, whether one or more conditions have been met for incrementing a progressive prize for the gaming session. If so, the method proceeds to operation 624 which includes incrementing, by the processor, a value of the progressive prize. If not, the method proceeds to operation 628. As noted above, the progressive prize may be a prize that increases in value and that is awarded to a player 112 that has the most accumulated points from among a group of players playing the gaming devices 108. Additionally or alternatively, the progressive prize may be awarded to a player 112 that reaches a threshold amount of accumulated points before other players 112. The progressive prize may be incremented by an amount that is based on a value of wagers placed by players 112, a number of players 112 playing the game, a number of wagers placed by the players 112, etc. According to at least one embodiment, the processor may apply a multiplier to a normal increment of the progressive prize, for example, when a wager is made that is over a threshold amount, based on player history (e.g., when an amount of time spent playing the particular game is over a threshold amount of time), when the game enters a bonus round, and/or other factors associated with higher risk and/or player loyalty to the game. The one or more conditions that should be met before incrementing the progressive prize may include a player 112 wagering a threshold amount on a particular spin of a slot machine, hand of video poker, etc. The threshold amount may be a design parameter set based on empirical evidence and/or preference. In at least one embodiment, the threshold amount may be a maximum allowable wager for the game being played. The one or more conditions may further include meeting a desired threshold number of players 112 playing the game across multiple gaming devices 108.

Operation 628 including determining, by the processor, whether the gaming devices 108 have reached the end of the competitive gaming session. If so, the method proceeds to operation 632. If not, the method proceeds back to operation 604. The end of the competitive gaming session may be determined to occur after a desired amount of time (e.g., ten minutes), when a player 112 reaches a threshold amount of accumulated points, when a player 112 leaves the competitive gaming session, when a threshold number and/or amount of wagers have been placed during the competitive gaming session, etc.

In operation 632, the method includes determining, by the processor, whether the accumulated first points by the first player 112 is greater than the accumulated second points by the second player 112. If so, the method proceeds to operation 636 which includes assigning, by the processor, a value of the progressive prize to the first record associated with the first player 112. If not, the method proceeds to operation 640 which includes assigning, by the processor, a value of the progressive prize to the second record associated with the second player 112. Although not explicitly shown, if the accumulated first points are the same as the accumulated second points, then the method may include a playoff game or session between the players 112 that may end when a player 112 reaches a desired threshold number of extra points, after a desired amount of time, etc.

Although embodiments have been described with respect to two players 112 playing a game for a competitive session on two gaming devices 108, embodiments may include more players and more gaming devices if desired.

In view of the above, it should be appreciated that embodiments of the present disclosure provide a competitive gaming session between two or more players playing a same type of game, where the rules that govern the game have been altered from default rules to customized rules selected by the players. As the competitive gaming session progresses, prizes are awarded to players based on their customized rules and at the end of a gaming session, a progressive prize may be awarded to the player having the most accumulated points.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A system, comprising:

a communication interface that enables communication over a communication network;

a processor;

a memory coupled with and readable by the processor, the memory storing instructions, which when executed by the processor, cause the processor to:

receive, based on input by a first player to a user interface of a first gaming device, first customized rules for a first instance of a game to be played by the first player on the first gaming device, the first customized rules being different than default rules of the game;

receive, based on input by a second player to a user interface of a second gaming device, second customized rules for a second instance of the game to be played by the second player on the second gaming device, the second customized rules being different than the default rules of the game;

establish, over the communication network using the communication interface, a competitive gaming session between the first gaming device and the second gaming device to initiate the first and second instances of the game;

apply the first customized rules to play the first instance of the game on the first gaming device to generate first customized game play information; and apply the second customized rules to play the second instance of the game on the second gaming device to generate second customized game play information.

2. The system of claim 1, wherein the memory further comprises instructions that cause the processor to extract the first customized rules from a data structure associated with the first player and extract the second customized rules from a data structure associated with the second player.

3. The system of claim 1, wherein the first customized rules comprise a first selection of a first set of gaming events desired by the first player, and wherein the second customized rules comprise a second selection of a second set of gaming events desired by the second player, the first set of gaming events and the second set of gaming events being selected from a same main set of gaming events.

4. The system of claim 3, wherein a first probability of a first gaming event in the first set of gaming events occurring is different from a second probability of a second gaming event in the second set of gaming events occurring.

5. The system of claim 4, wherein the memory further comprises instructions that cause the processor to:

assign a first point value to the first gaming event based on the first probability; and assign a second point value to the second gaming event based on the second probability.

6. The system of claim 5, wherein the memory further comprises instructions that cause the processor to:

track first points accumulated by the first player playing the first instance of the game for a duration of the competitive gaming session using the first point value; and track second points accumulated by the second player playing the second instance of the game for the duration of the competitive gaming session using the second point value.

7. The system of claim 6, wherein the memory further comprises instructions that cause the processor to:

establish a first prize for the first gaming event for the competitive gaming session;

establish a second prize for the second gaming event for the competitive gaming session;

assign a value of the first prize to a first record associated with the first player when the first gaming event occurs on the first gaming device; and assign a value of the second prize to a second record associated with the second player when the second gaming event occurs on the second gaming device.

8. The system of claim 1, wherein the first gaming device comprises the communication interface.

9. A gaming device, comprising:

a communication interface;

a user interface;

a processor coupled with the communication interface;

a memory coupled with and readable by the processor, the memory storing instructions, which when executed by the processor, cause the processor to:

receive, based on input by a first player to the user interface, first customized rules for a first instance of a game to be played by the first player on the gaming device, the first customized rules being different than default rules of the game;

establish, over the communication interface, a competitive gaming session with a second gaming device, wherein the second gaming device is running a second instance of the game that adheres to second customized rules for the game as selected by a second player of the second gaming device, the second customized rules being different than the default rules of the game;

apply the first customized rules to play the first instance of the game on the gaming device to generate first customized game play information;

apply the second customized rules to play the second instance of the game on the second gaming device to generate second customized game play information; and assign a value of a prize to an electronic record based on the first and second customized game play information.

* * * * *